(No Model.) 4 Sheets—Sheet 1.

F. H. RICHARDS.
WEIGHING MACHINE.

No. 565,223. Patented Aug. 4, 1896.

Witnesses:
Chas. D. King
Fred. J. Dole

Inventor:
F. H. Richards (No Model.) 4 Sheets—Sheet 2.

F. H. RICHARDS.
WEIGHING MACHINE.

No. 565,223. Patented Aug. 4, 1896.

Witnesses:
Chas. D. King.
Fred. J. Dole.

Inventor:
F. H. Richards.

(No Model.) 4 Sheets—Sheet 3.

F. H. RICHARDS.
WEIGHING MACHINE.

No. 565,223. Patented Aug. 4, 1896.

Witnesses:
Chas. D. King.
Fred. J. Dole.

Inventor:
F. H. Richards.

(No Model.)  4 Sheets—Sheet 4.
F. H. RICHARDS.
WEIGHING MACHINE.
No. 565,223.  Patented Aug. 4, 1896.
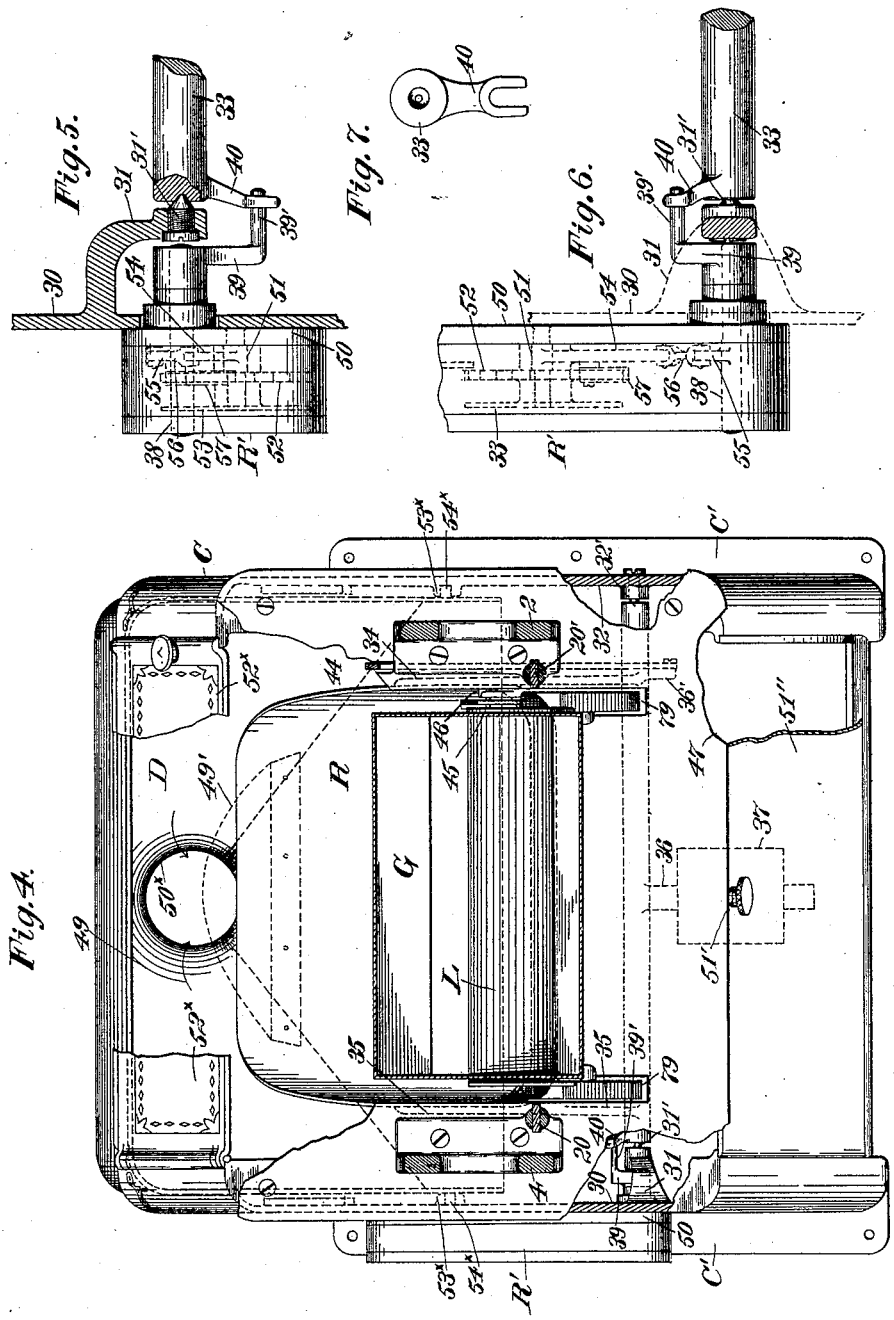
Witnesses:
Chas. D. King.
Fred. J. Dole.
Inventor:
F.H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 565,223, dated August 4, 1896.

Application filed February 25, 1896. Serial No. 580,689. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines.

The object of the invention is to provide improved weighing mechanisms or machines of relatively small capacities for weighing spices, proprietary foods, and the like. Said machines, as usually constructed, have not had, in themselves, power nor length of stroke of any of the operative mechanisms thereof sufficient to operate a register or other adjacent device, and my machine is especially designed to obviate the difficulty heretofore encountered and to utilize the power of the descending load as a means for actuating said adjacent device.

Figure 1:
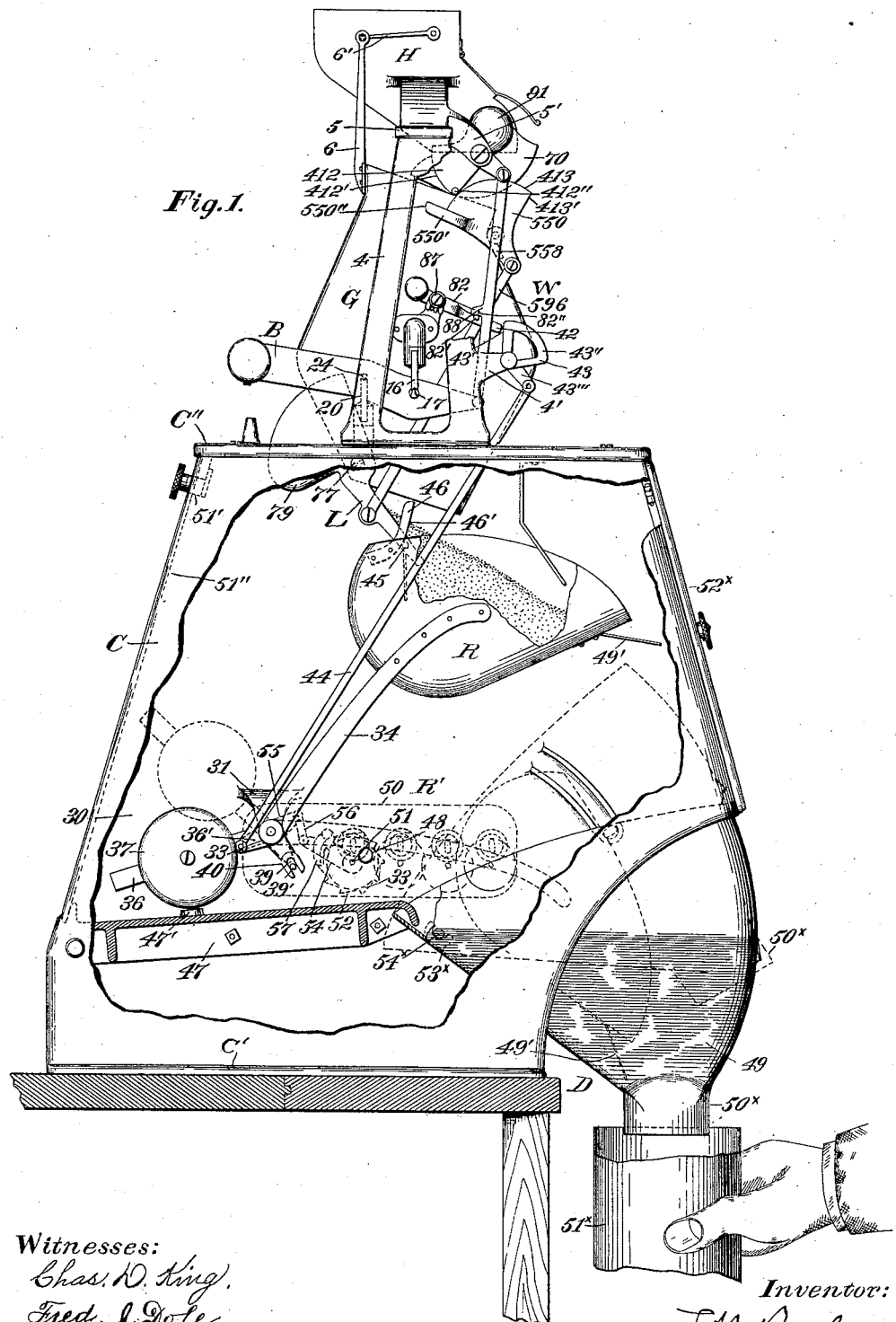
Figure 2:
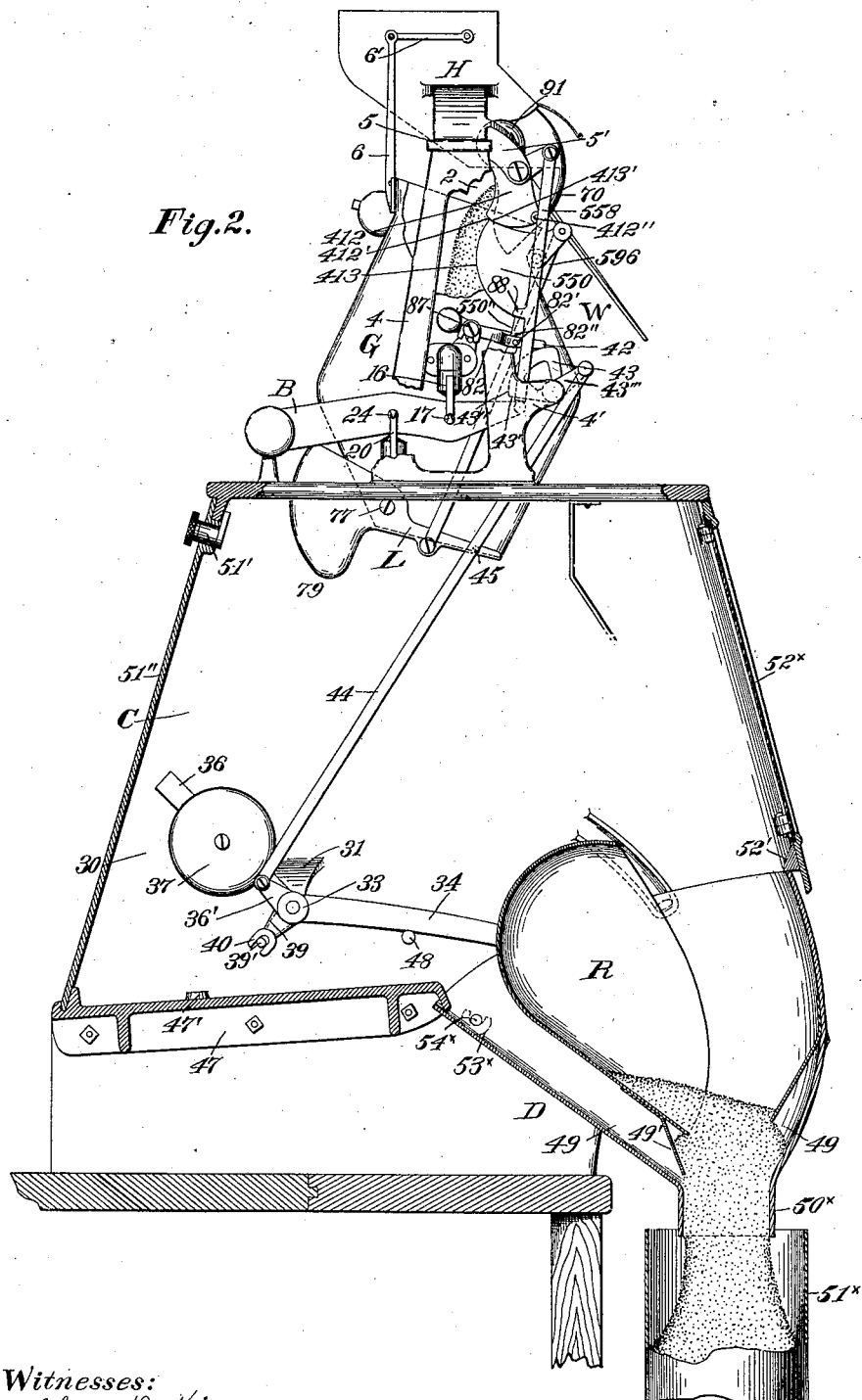
Figure 3:
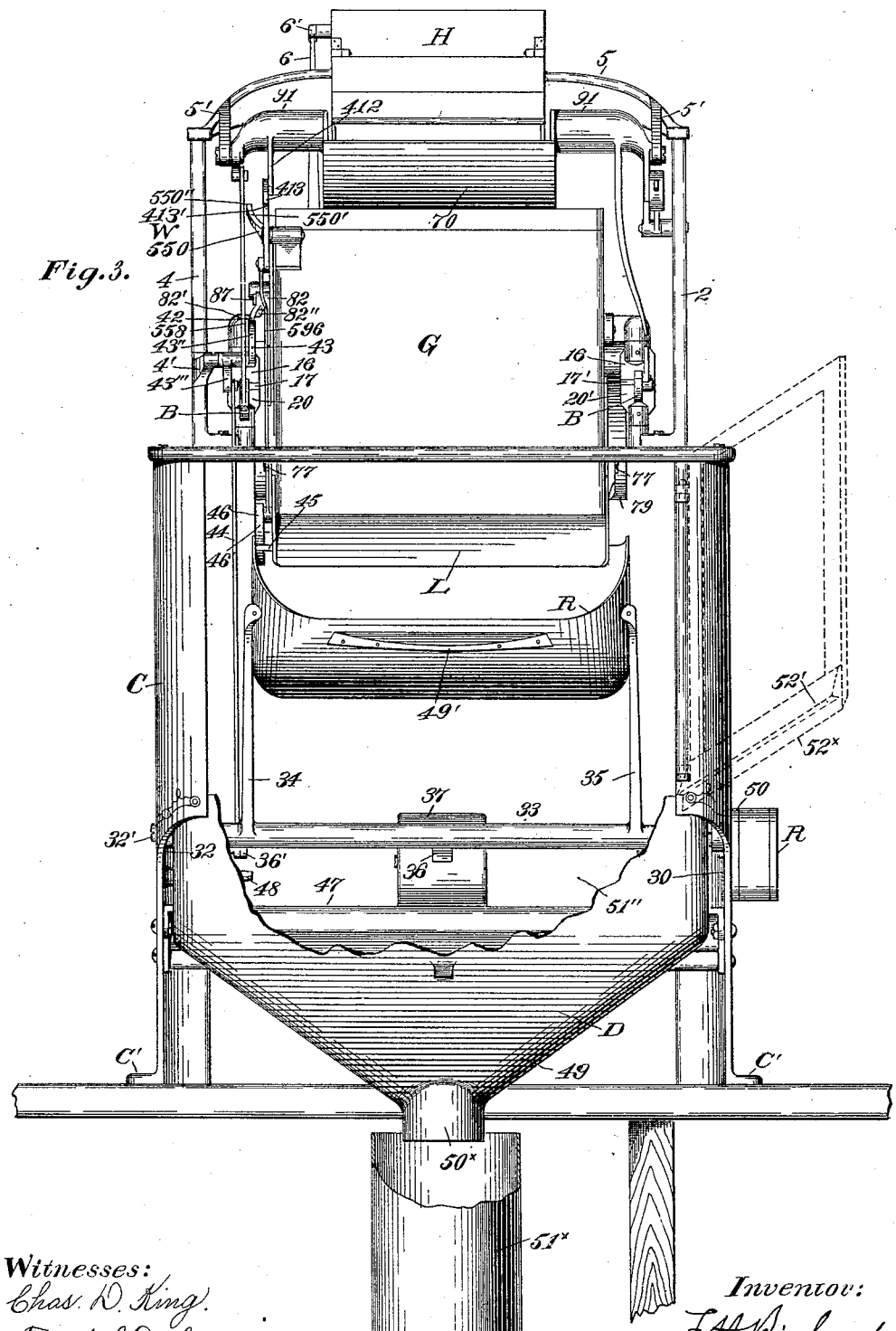

In the drawings accompanying and forming part of this specification, Figure 1 is a left-hand end elevation of the apparatus, parts being broken away to better illustrate certain of the operative mechanisms thereof. Fig. 2 is a similar view illustrating a succeeding step in the operation of the apparatus, the casing or chamber for containing the register-operating means being in central vertical section. Fig. 3 is a front elevation of the apparatus with the mechanisms in positions corresponding with Fig. 1. Fig. 4 is a plan view with parts broken away and with the weighing mechanism in horizontal transverse section. Figs. 5, 6, and 7 are detail views of certain of the operative parts of the register-operating means.

Similar characters designate like parts in all the figures of the drawings.

One of the constituent elements of the invention is a weighing mechanism or machine which may be of any suitable construction; but, for convenience in illustrating the nature and purpose of said invention, I have shown and will hereinafter describe a weighing mechanism or machine of the type disclosed in Letters Patent No. 548,840, granted to me October 29, 1895, to which reference may be had.

A casing or chamber for containing certain of the operative mechanisms of the register-actuating means is designated by C, and is shown supported by a bracket C', the top plate C'' of said casing constituting a support for the framework of the weighing mechanism, which latter is designated, in a general way, by W.

The plate C'' is illustrated carrying beam-supports 20 and 20' in the form of V-shaped bearings for pivotally supporting the scale-beam, which is designated in a general way by B and is shown carrying pivots or knife-edges 24 and 24', supported by said V-shaped bearings 20 and 20'.

The scale-beam B is illustrated carrying a second pair of pivots or knife-edges 17 and 17', which constitute bucket-supports, and which are illustrated supporting the V-shaped bearings 16, carried on the ends of the bucket, which latter is of the "single-chambered" type or class and is designated, in a general way, by G.

The framework for carrying the operative parts of the weighing mechanism is shown comprising the side frames or uprights 2 and 4, mounted upon the plate C'', and connected by a top plate or beam 5.

The top plate 5 is illustrated carrying the supply chute or hopper H, which is adapted for containing the mass of material to be weighed, which, in practice, is supplied thereto by a suitable elevator apparatus. (Not shown.)

The bucket mechanism embodies two members, one of which is shiftable relatively to the other for discharging the bucket-load, and the bucket-closer—which is designated in a general way by L—is illustrated constituting such shiftable member, a latch (to be hereinafter described) being normally operative for maintaining said member against shifting movement.

The bucket-closer is shown pivotally supported at 77 to the lower, forward side of the bucket G and adjacent to one wall of the discharge-opening thereof, and as having the counterweighted arms or plates 79, which normally tend to close the same, as indicated in Fig. 2.

As a means for supporting the bucket-closer an inverted toggle is shown connecting the closer with the bucket, and this toggle is so positioned as to be engaged by a closer-latch when the latch is in its operative position and the closer is shut. In the form illustrated this toggle comprises the rocker 550, pivotally supported on the upper, rearward side of the bucket G, and having a long connecting-rod 596, pivotally connected to said closer and to the rocker in such a manner that when the closer is shut the two pivots of said connecting-rod or toggle member will be nearly in line with, and the upper of said pivots will be above, the rocker-pivot. The closer-latch for locking the rocker in position when the closer is shut is designated by 82, and is shown pivotally supported at 87 on one end of the bucket G, and as having a detent or stop 82″ (see dotted lines, Figs. 1 and 2) in position for engaging a coöperating detent or stop 550″ on one end of the detent-arm 550′ of the rocker when the parts are in the closed position previously described. The closer-latch 82 is shown counterweighted and as also limited in its movement toward the stop on the toggle connection by suitable stops. In the embodiment illustrated the closer-latch 82 swings upward to engage the stop-arm on the rocker, and it will be evident that said latch may be released from engagement therewith by a downward pressure or movement.

As a means for controlling the supply-stream from the chute or hopper H a valve 70 is illustrated, which is substantially similar in construction and mode of operation to the improved valve disclosed in Letters Patent No. 535,727, granted to me March 12, 1895, to which reference may be had.

The valve 70 is illustrated pivotally supported for oscillatory movement between the arms or brackets 5′ of the top plate 5 of the weighing mechanism. The valve 70 is also illustrated located substantially beneath the mouth of the supply-chute and extending beyond the forward edge of said chute sufficiently far to support the descending column or stream of material when closed, and as also preferably balanced, a balance-weight 91, extending from opposite ends of the valve-pan, being employed for this purpose, so that the valve has in itself no tendency to either open or close.

As a means for actuating the valve to close the same any suitable mechanism for this purpose may be employed—for example, the improved valve-actuating mechanism shown and described in Letters Patent No. 548,843, granted to me October 29, 1895, to which reference may be had.

The valve will be preferably opened from and by the scale-beam B, the latter also serving as a means for limiting the closing movement of the valve by the valve-closing mechanism.

A connecting-rod 558 is illustrated pivotally connected with the valve at a point to the rear of the pivot thereof, the lower end of said rod being in position to be engaged by one of the arms of the scale-beam B, so that on the descending movement of the scale-beam the latter tends to limit the closing movement of the valve. On the return or ascending movement of said scale-beam to its normal position, as indicated in Fig. 2, an upward thrust will be imparted to said rod 558 for opening the valve.

Means are employed for steadying the bucket during the ascending and descending movements thereof, the means employed connecting the bucket with a fixed part of the apparatus. The bucket is shown carrying the arm or riser 6, which may be riveted thereto, as illustrated, and to the upper end of which is shown pivotally connected the link 6′, the latter being also illustrated pivotally connected with the chute H.

The weighing mechanism embodies reciprocally-effective stops operative, respectively, with the valve and with the closer, each of which serves as a stop device for the other for preventing the opening movement of the valve by the non-closing of the closer or while the bucket is discharging the load, and the opening movement of the closer by the non-closing of the valve or while the supply-stream is flowing into the bucket.

The rocker 550 is illustrated constituting a closer-operative stop, and the valve-operative stop is designated by 412.

The valve-operative stop 412 is illustrated having the supplemental stops 412′ (illustrated as a curved face concentric with the axis of movement of the valve) and 412″, the latter being illustrated as an antifriction-roll.

The closer-operative stop 550 is also illustrated provided with a pair of supplemental stops 413 and 413′, the first of which is a curved face concentric with the center of movement of said stop 550, and the other of which is an approximately straight face departing from said curved face.

During the closing movement of the valve the supplemental stop 413′ of the closer-operative stop 550 will be in contact with, or approximately in contact with, the supplemental stop 412′ of the valve-operative stop 412, so that should the bucket-closer L be accidentally released it will be prevented from opening by this contact, the valve-operative stop member 412 acting practically as a fixed abutment. As soon, however, as the two stop-faces have passed out of contact and the supplemental stop 412″ has intersected the plane of curvature of the supplemental stop 413 the closer may then be opened. On the opening of the closer the stop member 550 will oscillate about its pivot, and the curved stop-face 413 thereon will be in contact with the supplemental stop or antifriction-roll 412″ of the valve-operative stop member 412, so that reverse movement of the valve, or tendency thereof to open, will be prevented by the stop 550, the roll 412″ abutting against the stop member 550 and being in contact with the curved stop-face 412′ thereof, and the valve will be maintained in its closed position so long as these stops 413 and 412″ are in contact. As the closer closes, the stop member 550 will be rocked about its pivot, and when the curved stop-face 413 has passed beyond the supplemental stop 412″, the closer then being closed and the supplemental stops 413′ and 412′ being again in contact, (see Fig. 2,) the valve may be opened.

In weighing machines or mechanisms of very small capacities, used for weighing spices, proprietary foods, and the like, in pound and fractional lots thereof, it is impossible to secure the registration of the bucket-loads thereof, as these are intermittently discharged, owing to the very small power of such machines and the shortness of stroke of the operative mechanisms thereof. It is, therefore, one of the aims of my present invention to overcome this difficulty, to provide a movably-supported, register-actuating receptacle located to receive and momentarily retain each of the bucket-loads discharged by the bucket of the weighing mechanism. This receptacle will preferably be located below the weighing mechanism, and on the completion of the bucket-load thereby said bucket-load will be discharged into said receptacle, from whence it may be directed into a suitable bag, box, &c., for such purpose. In practice this register-operating receptacle will have a relatively long stroke, so that on the movement thereof a registration of each of the bucket-loads discharged by the weighing mechanism will be positively insured.

The inner face of the end wall 30 of the casing C is illustrated provided with a bracket 31, near the lower end of which is formed a screw-threaded opening, and the opposite wall 32 of said casing is provided with a similar opening, in which openings are seated the pivot-screws 31′ and 32′, which constitute supports for the shaft 33 of the register-actuating receptacle R, said shaft being illustrated provided with the relatively long arms 34 and 35, which are connected with the register-actuating receptacle R by rivets or other suitable fastening means.

The register-actuating receptacle will be supported for reciprocatory movement beneath the bucket-closer L of the weighing-machine W, and on the opening movement of the bucket-closer L the bucket-load will be discharged into said receptacle R, the bucket-closer L serving as a chute for directing the mass into said receptacle.

Means will be provided for maintaining the register-actuating receptacle in its normal or inoperative position, as indicated in Fig. 1, so that at the proper point in the operation of the apparatus the bucket-load may be discharged into said receptacle, and for this purpose I prefer to employ a counterbalanced receptacle.

The supporting-shaft 33 is shown provided with the forwardly-extending weight-carrying arm 36, the weight 37 thereon being preferably adjustable along said arm to adapt the apparatus to varying conditions—such as weighing materials of different specific gravities. The counterbalance should exert a force somewhat less than the weight of the loaded receptacle R, so that the latter when released may overbalance said weight and have a descending movement for actuating the register in a manner to be hereinafter described and for discharging the contents thereof.

The end wall 30 of the casing C is illustrated carrying the register R′ of some suitable type, which is in position to be actuated by and on the descending movement of the receptacle R through operative connections therewith.

The register R′ is shown provided with a rock-shaft 38, which is passed through an opening formed in the end wall 30 of the casing C and as carrying on its inner end the crank-arm 39, the wrist or pin 39′ of which is shown embraced or straddled by the bifurcated rock-arm 40, formed on the supporting-shaft 33 of the receptacle R.

The back plate 50 of the register is shown provided with the stud 51, (see dotted lines, Figs. 5 and 6,) about which the ratchet 52 and integrally-formed indicating-dial 33 are rotative, the last-mentioned device being provided on its face with the usual numbers from "0" to "9." The stud 51 is also illustrated carrying the rock-arm 54, which is sleeved thereto, the function of which will be hereinafter described.

The rock-shaft 38 of the register is shown provided with the lug 55, to which is shown pivotally connected the link 56, the opposite end of the latter being also pivotally connected with the rock-arm 54.

The rock-arm 54 is illustrated pivotally carrying the gravity-pawl 57 for engaging the teeth of the ratchet 52 and for rotating the latter one division or tooth on each stroke or descending movement of the receptacle R through operative connections therewith. As the receptacle R descends for discharging its contents its supporting-shaft 33, the bifurcated rock-arm 40, and the register rock-shaft 38 will move in coinciding directions, whereby the pawl 57, through the operative connections with said rock-shaft 38, will be effective for rotating the ratchet 52 one division or tooth on each of such movements of the receptacle R. The ratchet 52 may be connected with a train of register gears or wheels of suitable number, which may operate in the well-known manner.

My present invention also contemplates the provision of means for preventing the discharge of the bucket-load by the bucket of the weighing mechanism during the discharging period of the register-actuating receptacle, and also means for preventing the discharge movement of said receptacle until the bucket has discharged its load into said receptacle, whereby, on the one hand, the bucket-load would be discharged without being registered, and whereby, on the other hand, a partial bucket-load only might be registered. For effecting these peculiar functions I prefer to employ reciprocally-effective stops operative, respectively, with the weighing mechanism and with the register-actuating receptacle, each of which stops serves as a stop device for the other.

The bucket-closer latch 82 is illustrated constituting a stop—being provided with a stop portion thereon—which, when said latch is thrown from its normal position to its inoperative position for releasing the bucket-closer, will be effective for also limiting the discharge movement of the register-actuating receptacle so long as the bucket-closer is in its open position.

The register-actuating receptacle R is also illustrated coacting with a stop operative therewith, which is adapted for maintaining said latch in its operative position while said receptacle is discharging its contents.

The stop portion of the bucket-closer latch 82 is illustrated at 42, and the coacting stop, operative with the register-actuating receptacle R, is designated by 43.

The side frame 4 of the framework of the weighing mechanism is illustrated provided with a rearward projection or bracket 4', in which is shown supported for oscillatory movement the stop 43 to which reference has hereinbefore been made, and which is of segmental shape and has the stop or working faces 43' and 43'', the latter of which is a curved face. The stop 43 is operatively connected with the register-actuating receptacle R by the relatively long connecting-rod 44, the latter being shown pivotally connected with the integral arm 43''' of said stop 43 and with the rock-arm 36' on the shaft 33, so that, the movement of said stop 43 being limited, the discharge movement of the receptacle R may be correspondingly limited by the operative connections therebetween.

The normal position of the stop-segment 43 of the register-actuating receptacle R is illustrated in Fig. 1, the bucket G being also illustrated discharging its load into said receptacle.

It will be remembered that the bucket-closer latch 82 is normally operative for preventing the opening movement of the closer L, but that said closer may be released by the disengagement of the detents of said latch 82 and the rocker 550 by a downward movement. On the downward movement of said latch the stop portion 42 thereof will be projected into contact, or approximately in contact, with the straight stop-face 43' of the stop 43, so that any tendency of the receptacle R to oscillate about its pivot for discharging its load will be prevented by limitation in movement of the stop 43 by the abutment thereof against the stop portion 42 of the latch, and this discharge movement of said receptacle will be prevented while said latch is in its inoperative position and the bucket-closer is open.

For depressing the latch to release the bucket-closer I prefer to employ a releaser device or actuator operative with the valve 70, which device has a descending movement on the closure of the valve, so that when said latch has been depressed the closer-operative stop 550, by holding the valve 70 in its closed position by engaging the valve-operative stop 412, will also hold said releaser device in engagement with the latch, so that the latter may be maintained in its position for limiting the movement of the receptacle R while the bucket-closer L is in its open position, and until the latter is closed.

The releaser device or latch-actuator is illustrated at 88, formed on the connecting-rod 558, carried by the valve. At the commencement of the poising period of the weighing mechanism the valve 70 will be momentarily held against further closing movement to permit the flow of the drip-stream into the bucket for the purpose of completing the bucket-load, and when released said valve will be closed for cutting off the drip-stream, during which last-mentioned operation the connecting-rod 558 will be thrust downwardly and the device 88 thereon into engagement with the pin 82', formed on the latch, this action depressing said latch and forcing it into the position indicated in Fig. 1, where said latch is held, while the closer L is in its open position.

When the closer is closing, the rocker 550, through the connecting-rod 596, will be returned to its normal position, (see Fig. 2,) where its detent 550'' may again be engaged by the detent of the latch 82, whereby the opening movement of the bucket-closer will be prevented. The bucket-closer L being closed and the bucket G being empty, the latter will ascend, the latch 82 thereon also having an ascending movement with said bucket, so that when the stop portion 42 has been carried above the plane of curvature of the stop-face 43'' of the stop-segment the register-actuating receptacle R is released and is free to descend when the weight of the contents or bucket-load therein will depress or move the same from the normal or load-receiving position to discharge said contents, Fig. 2, during which movement said receptacle R will actuate the register R' through the operative connections therewith.

As the receptacle R swings from its normal position to discharge its contents the stop-segment 43 will be also swung about its pivot on the framework of the apparatus from its normal position to the position illustrated in Fig. 2, the curved stop-face 43'' thereon being in position to limit the unlatching movement of the latch, so that the latter cannot be accidentally or otherwise depressed, the latch 82 abutting against the stop-face 43'', and so long as this relation continues the latch cannot be thrown to its inoperative position for releasing the bucket-closer L.

To further prevent the discharge movement of the receptacle R while the bucket-closer L is in its open position, the latter is shown provided with a stop (illustrated as a laterally-projecting pin 45) in position to be engaged by a coöperating stop on the receptacle R, the last-mentioned stop being illustrated as the upwardly-projecting arm 46, fixed to the receptacle R. The last-mentioned stop member 46 has a curved face substantially coinciding with an arc struck from the center of movement of the bucket-closer, which is in position to be engaged by the pin 45, so that the descending or discharge movement of the receptacle R will be positively prevented while these stops are in contact.

By reason of the peculiar curvature of the stop-face 46' the closing movement of the bucket-closer will not be prevented; but as soon as the stop-pin 45 on the bucket-closer L is above the plane of the upper edge of the stop-arm 46 the receptacle R will be released by the stop 45 and may descend for discharging its contents.

The end walls of the casing C are shown connected by the connecting-plate 47, which is held in place by bolts or other suitable fastening means.

The connecting-plate 47 is illustrated provided with a stop 47', which limits the descending movement of the counterweighted arm 36, and hence maintains the receptacle R in its normal position.

The end walls of the casing are shown provided with the stops 48, which limit the too-great descending or discharge movement of the receptacle R by engaging the supporting-arms 34 and 35 of the receptacle R.

A discharge-chute is illustrated at D, located to receive the contents of the receptacle R as these are discharged therefrom, and said chute D has a reduced portion 49, into which the mass is discharged, and by virtue of this reduced portion the outflow of the material is temporarily checked, for a purpose to be now described.

The receptacle R is illustrated carrying, at a point near the discharge edge thereof, the regulator or regulating-blade 49', which is adapted to take hold of the discharged mass while in this reduced portion of the discharge-chute, whereby the return movement of the receptacle R will be positively prevented, the mass acting against the regulator.

The discharge-chute D is also shown provided with the cylindrical spout $50^\times$, into which the mass gravitates from the discharge-chute to be conducted or delivered into a suitable can or other means—such as $51^\times$—adapted for the purpose.

It will be evident that when the mass has passed below the edge of the regulator 49' the receptacle R will be released and may be returned to its normal position by the counterweight 37 to receive a bucket-load from the bucket G of the weighing mechanism.

The casing C is shown provided with a removable front plate 51'', held in place by the hook bolt or bolts 51', and this may be locked against removal by a suitable lock (not shown) to prevent malicious tampering with the register-actuating means. The casing at the rear thereof is also illustrated provided with the door $52^\times$, which may be also locked in its closed position, and said door, near the lower edge thereof, is shown provided with a flange or web 52', the purpose of which will now be described.

For transportation and other purposes the discharge-chute may be swung up from its normal position, so that the spout $50^\times$ will be above the lower edge of the casing C. The inner faces of the end walls of the casing C are shown provided with the bearings $53^\times$ formed thereon, which constitute supports for the pintles $54^\times$, carried on the end walls of the discharge-chute.

To swing the discharge-chute up from its normal position, the door $52^\times$, the flange 52' of which normally holds the said chute against movement, is opened, when the discharge-chute may be grasped by hand and pushed up out of the way to the position shown by the dotted lines in Fig. 1, and when it has assumed this position the door will be closed and locked, the flange 52' engaging the rear wall of said chute D and preventing return movement of said discharge-chute while the door is in its closed position.

The operation of the hereinbefore described apparatus, briefly described, is as follows: On reference to Fig. 1, the bucket-closer is shown open and directing the last part of the bucket-load into the receptacle R, the discharge movement of which latter is prevented by the latch 82, which engages the stop-face 43' of the segmental stop 42, operative with said receptacle. When the bucket has completely discharged its load, the bucket-closer will be closed, this action imparting an upward thrust to the connecting-rod 596 and swinging the rocker 550 about its pivot, so that when the three pivots of the toggle connection are approximately in line (see Fig. 2) the detent of the latch 82 will engage the coöperating detent 550'' of the rocker 550, thereby holding the bucket-closer against opening movement. The bucket being empty then ascends and the stop portion 42 of the latch will be carried above the stop-face 43'' of the stop 43, so that the receptacle R is then free to descend for discharging its contents into the chute D, the latter, through the spout 50, directing the material into a can or other suitable device; and during this discharge or descending movement of the receptacle R the register R' will be actuated by the operative connections therewith.

While the receptacle R is in its discharging position (see Fig. 2) the curved stop-face of the stop 43 tends to maintain the latch 82 in its operative position. As the receptacle R ascends to its normal position to again receive the bucket-load—being returned to said normal position by the counterweighted arm 36—the latter will return the segmental stop 43 to its normal position through the medium of the connecting-rod 44, whereby the movement of said stop 43, and hence of the receptacle R, will be limited by the latch 82 as the latter is thrust downwardly for releasing the bucket-closer L, and the descending movement of said receptacle R will be prevented while said latch is in such position.

While I have shown means for actuating a register by the weight of the bucket-load in the receptacle R, it is obvious that other devices could be actuated by this means, if deemed necessary, and hence I do not desire to limit myself to the precise mechanical device—a register—shown and described.

Having thus described my invention, what I claim is—

1. In an apparatus of the class specified, the combination with weighing mechanism embodying a bucket, of a movably-supported, counterbalanced receptacle normally located to receive a load discharged by said bucket; and stop devices operative with said weighing mechanism and receptacle.

2. In a weighing-machine, the combination with weighing mechanism embodying a bucket, of a movably-supported receptacle; means for returning said receptacle to its normal position; and stop devices operative with said weighing mechanism and receptacle.

3. The combination with weighing mechanism embodying a shiftable bucket-discharge member and a latch operative for maintaining said member in its normal position, said latch also constituting a stop device; of a coacting stop device; a movably-supported receptacle normally located to receive a load discharged by said bucket; and a connection between said receptacle and said last-mentioned stop device.

4. The combination with weighing mechanism embodying a bucket, of a movably-supported receptacle normally located to receive a load discharged by said bucket; a connection between said receptacle and the weighing mechanism; a stop device operative with said connection; and a discharge-chute supported for swinging movement and located to receive the contents from said receptacle.

5. The combination with weighing mechanism embodying a bucket; of a casing for supporting said weighing mechanism; a movably-supported receptacle normally located to receive a load discharged by said bucket, and having also a movement for discharging its contents; a connection between said receptacle and weighing mechanism; a discharge-chute supported for swinging movement between the walls of said casing and located to receive the contents from said receptacle; and a flanged door hinged to said casing, the flange of which engages one of the walls of said discharge-chute.

6. An apparatus of the class specified, comprising weighing mechanism embodying a bucket; a casing having an opening; a rock-shaft projecting through said opening; a crank-arm on said rock-shaft, said crank-arm having a pin; a second rock-shaft having a bifurcated rock-arm, the bifurcation of which straddles the pin of said crank-arm; said rock-shaft having also a relatively long arm or arms; a receptacle carried by said arm or arms and normally located to receive a load discharged by said bucket, and having also a descending movement from said normal position to discharge the contents thereof; and means for returning said receptacle to its normal position, whereby a register or adjacent mechanism may be actuated, substantially as and for the purpose specified.

7. In an apparatus of the class specified, the combination with weighing mechanism embodying a bucket; of a movably-supported receptacle normally located to receive a load discharged by said bucket, said receptacle having also a discharge movement; and stop device for preventing the discharge movement of said receptacle during the load-discharging period of said bucket.

8. In an apparatus of the class specified, the combination with bucket mechanism embodying two members, one of which is shiftable relatively to the other for discharging the load; of a movably-supported receptacle normally located to receive a load discharged by said bucket, and having also a movement for discharging the contents thereof; and stop device operative with said receptacle for preventing the movement of the shiftable member of the bucket mechanism while said receptacle is in its discharging position.

9. In an apparatus of the class specified, the combination with weighing mechanism embodying a bucket; of a movably-supported actuating-receptacle normally located to receive a load discharged by said bucket, and having also a discharge movement; and reciprocally-effective stop devices operative, respectively, with said weighing mechanism and receptacle, each of which stops constitutes a stop device for the other.

10. In an apparatus of the class specified, the combination with weighing mechanism, the bucket mechanism thereof embodying two members, one of which is shiftable for discharging the bucket-load; of a latch normally operative for holding said shiftable member against movement, said latch constituting also a stop; a movably-supported receptacle normally located to receive a bucket-load, and having also a discharge movement; a latch-actuator in position for engaging said latch to throw the same into position to release the said shiftable member; and a stop device operative with said receptacle, and in position to be engaged by said latch when in its last-mentioned position.

11. In an apparatus of the class specified, the combination with weighing mechanism; the bucket mechanism thereof embodying two members, one of which is shiftable relatively to the other for discharging the bucket-load; of a latch normally operative for holding said shiftable member against movement; a movably-supported receptacle adapted when in its normal position to receive a load discharged by said bucket, and having also a discharge movement; and a device operative with said receptacle, and in position for maintaining said latch in its normal position, during the discharging period of the receptacle.

12. In an apparatus of the class specified, the combination with weighing mechanism; the bucket mechanism thereof embodying two members, one of which is shiftable relatively to the other for discharging the bucket-load; a valve; a stop operative with said shiftable member and in position for limiting the movement of said valve; a latch normally operative for holding said shiftable member against movement; a latch-actuator operative with said valve, and adapted for throwing said latch into position to release said shiftable member of the bucket mechanism; a movably-supported receptacle located to receive a load discharged by said bucket, and having also a discharge movement; and a stop device operative with said receptacle, and in position to be limited in its movement by said latch.

13. In an apparatus of the class specified, the combination with a bucket having a closer; of a stop carried by said closer; a receptacle located normally to receive a load discharged by said bucket, and having also a discharge movement; and a stop-arm carried by said receptacle and adapted to be engaged by the stop carried by the bucket-closer, whereby the discharge movement of said receptacle will be prevented while these stops are in engagement.

14. The combination with a casing, of weighing mechanism embodying a bucket supported thereby; a movably-supported counterbalanced receptacle normally located to receive a load of material discharged by said bucket; reciprocally-effective stops operative, respectively, with said weighing mechanism and receptacle; a discharge-chute supported for swinging movement between the end walls of the casing and located to receive the contents discharged by said receptacle; and a flanged door hinged to said casing, the flange of which engages said discharge-chute.

15. In an apparatus of the class specified, the combination with weighing mechanism embodying a bucket; of a movably-supported receptacle located to receive a load discharged by said bucket; a rock-shaft having a counterweighted arm, and having a relatively long arm or arms connected with said receptacle; stop members operative, respectively, with the weighing mechanism and with said receptacle; and a connecting-rod operatively connecting the stop member of the receptacle and the counterweighted arm of said receptacle.

FRANCIS H. RICHARDS.

Witnesses:
FRED. J. DOLE,
R. W. PITTMAN.